Feb. 21, 1933.     D. C. DODRILL     1,898,244
AUTOMATIC FLOW REGULATOR
Filed Nov. 20, 1930
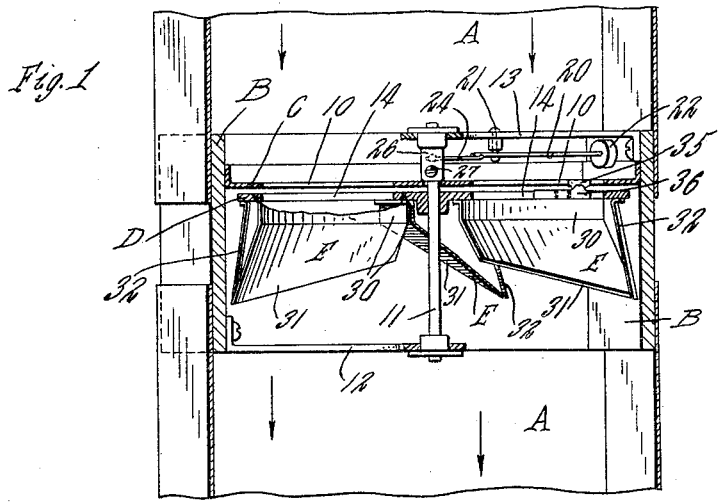
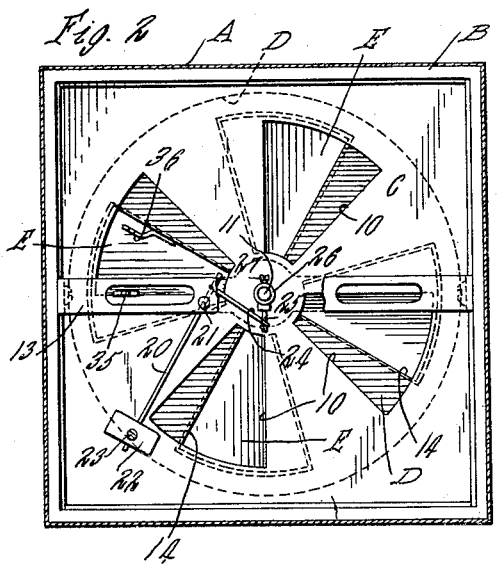
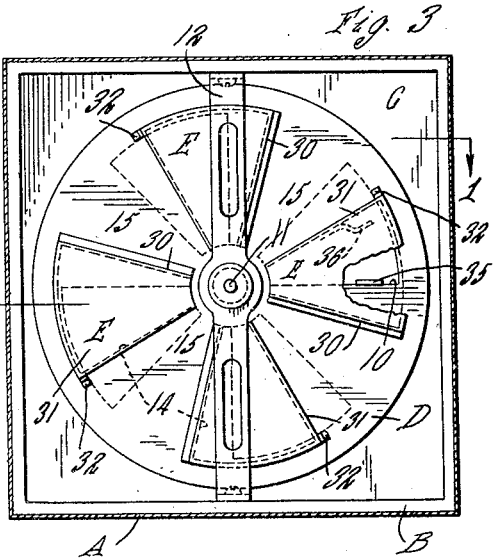
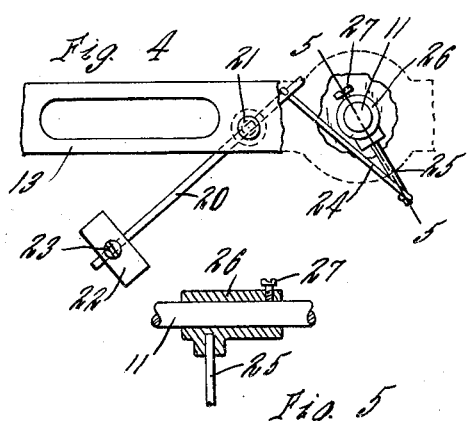
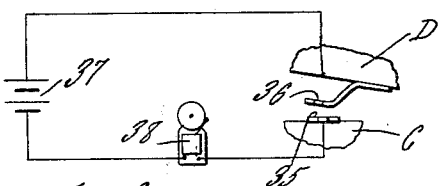
INVENTOR
Delbert C. Dodrill
by Parker & Crochnow
ATTORNEYS

UNITED STATES PATENT OFFICE

DELBERT C. DODRILL, OF BOOTH, WEST VIRGINIA, ASSIGNOR TO JAY F. HOOVER, OF BUFFALO, NEW YORK

AUTOMATIC FLOW REGULATOR

Application filed November 20, 1930. Serial No. 497,002.

This invention relates to improvements in dampers or flow regulators for controlling the flow of fluids in passages.

The objects of this invention are to provide a damper of this kind of improved construction, which is inexpensive to manufacture and comprises few parts, one of which is movable in accordance with the velocity of the fluid in the passage to regulate the damper opening; also to provide a device of this kind which comprises two relatively movable apertured parts, one which has vanes on which the fluid impinges to move the part in a direction to restrict the aperture in the stationary part; also to improve dampers of this kind in other respects hereinafter specified.

In the accompanying drawing:

Fig. 1 is a longitudinal, sectional view of a damper embodying this invention, the section being taken approximately on line 1—1, Fig. 3.

Figs. 2 and 3 are face views thereof, showing respectively the inlet and discharge faces of the damper.

Fig. 4 is a fragmentary view thereof, on an enlarged scale, showing means for yieldingly holding the movable damper member in open position.

Fig. 5 is a fragmentary section thereof on line 5—5, Fig. 4.

Fig. 6 is a diagrammatic view of a signal adapted to be actuated when the movable member approaches the closed position.

The flow regulator or damper embodying this invention may be installed in any opening or passage through which the fluid is conducted, and in the accompanying drawing the damper shown is arranged in a passage or duct A of any suitable form. While the device is primarily intended for use in regulating the flow of air, it will be obvious that the damper may equally well be used in connection with the regulation of the flow of other gases or liquids.

B represents the housing of the damper, which in the particular construction, shown, is substantially square in cross section, but which may, of course, be of any desired shape or form. The damper includes a stationary plate or member C having openings therein through which the fluid to be regulated passes, the plate shown being secured to the outer frame member B and having a plurality of sector-shaped openings 10 therein arranged about the center of the plate. D represents a movable plate or member which is arranged in close proximity and parallel to the fixed plate and which, in the particular construction illustrated, is movable about the center of the fixed plate, being secured to a shaft 11 suitably journalled at one end in a cross member or bar 12, the ends of which may be secured to the frame B. The other end of the shaft is journalled in a similar cross bar 13, also secured to the frame B. The movable member, therefore, may turn with the shaft 11, and this member is provided with a series of openings or apertures 14 which are adapted to be moved into and out of registration with the openings 10 in the fixed member. The movable member is provided between its apertures 14 with imperforate portions 15 which act as shutters, and which move crosswise of the openings 10 in the fixed member to partially cover these openings to regulate the flow of fluid therethrough, when the movable member turns about its axis. It will, of course, be obvious that the shape or form of the fixed and movable members shown in the drawing may be varied as desired, and the movable member may move in different relations to the fixed member, and need not necessarily oscillate about a center.

The movable member is normally held in a position in which the openings 10 of the fixed member are entirely or partly uncovered by the shutters 15, so that fluid may pass comparatively freely through the damper. In order to yieldingly hold the movable member in such position, any suitable or desired yielding means may be employed, and in the particular construction illustrated, an arm 20 is pivoted at 21 on the cross bar 13, and a weight 22 is held on the arm 20 and may, if desired, be adjusted lengthwise thereof in any suitable or well known manner. For example, the weight 22 may be held on the arm 20 by a set screw 23, Fig. 4, and may be secured to this arm in different positions lengthwise thereof. The pivoted arm 20 is pivotally connected with a link 24, the other end of which connects with an arm 25 rigidly secured on a sleeve 26 which is adjustably secured on the shaft 11, a set screw 27 being provided to secure the sleeve 26 in various positions about the axis of the shaft.

By means of the construction described, the weight 22 acting through the pivoted arm 20, link 24 and arm 25 will normally swing the movable member into a position in which the apertures 14 therein are in registration with the apertures 10 of the fixed member. In order to vary the capacity of the damper, the sleeve 26 may be secured in various angular relations with reference to the shaft 11, so that if the damper is to operate on a smaller volume of fluid, the sleeve 26 can be set in a position in which the apertures 10 of the fixed member may be partially closed by the shutter parts 15 of the movable member when the movable member is in its normal position.

The damper acts to prevent an excessive volume of fluid from flowing through the same, and for this purpose the movable member of the damper is moved in a direction to cause the shutters to move across the apertures 10 in accordance with increases in the rate of flow of fluid. In order to effect this result, the movable member has vanes E secured thereto. Any desired number of these vanes may be employed, the damper in the construction illustrated, having a vane for each opening 14 on the movable member. The vanes are rigidly secured to the movable member, and are acted upon by fluid after it has passed through the apertures 10 and 14.

The vanes E may be of any suitable or desired construction, those shown each including a portion 30 which extends substantially at right angles to the surface of the movable member D, and is secured thereto and an inclined or vane surface 31 which, in the construction shown, is formed integral with the part 30 and extends at an inclination crosswise of the opening 14. 32 represents a brace member connecting the outer end of the inclined surface 31 and the movable member D, to hold the vane in correct relation to the movable member. Any other form of vane may be used, if desired.

In the operation of the construction described, when no air flows through the regulator, the movable member will be held by the weight 22 in a position in which the apertures 14 of the fixed member are uncovered to the desired extent by the shutter members 15 of the movable member, the extent to which the apertures are uncovered being determined by the positioning of the sleeve 26, as has been described. As air passes through the openings 10 and 14 in the direction indicated by the arrow in Fig. 1, the air will impinge on the vanes E and will urge the movable member in a direction to move the shutter parts 15 of the movable member crosswise of the openings 10 of the fixed member, and as the velocity of the fluid increases, the vanes will have a greater tendency to move the movable member into an aperture-closing position. It is, of course, desirable that some air shall always pass through the damper, and consequently, as the velocity of the air increases and the unobstructed portions of the openings 10 in the fixed member become reduced by the shutter parts 15 of the movable member, a smaller quantity of air will pass through the openings 10 to act on the vanes E, so that the force acting on the vanes and the force of the weight 22 acting on the movable member will become balanced before the openings 10 can be entirely closed. By adjusting the weight 22 lengthwise of the arms 20, the resistance of the movable member against turning, due to the force exerted by the air flow against the vanes may be varied, so that the flow regulator may be adapted to operate at widely different air velocities.

When a regulator embodying this invention is used in connection with the ventilation of mines, where a single blower is used to pass air through a number of different branch passages, each branch passage is equipped with one of these dampers, and if for any reason the blower tends to pass an excessive quantity of air through one of the ducts and thus cause insufficient quantities to flow through the other ducts, it would be desirable to actuate a warning signal. This can readily be effected by placing a pair of electric contacts 35 and 36 respectively on the fixed and movable members in such a manner that the contacts would engage when an excessively large amount of air flows through a damper, which in turn would cause the movable member of such damper to move into a position to almost close the apertures 10 therein. These contacts would then complete a circuit including a source of power 37 and a suitable warning signal 38 diagrammatically shown in Fig. 6, which may be in the form of a bell or other audible or visible signal. Any other means for actuating the signal by the movement of the movable member may be employed, or, if desired, the signal may be omitted from the damper.

I claim as my invention:

1. A flow regulator including a fixed member having an opening therein, a member movable about a pivot through a part of a revolution and arranged in close proximity to said fixed member and having a shutter part adapted to move across said opening to restrict the flow of fluid therethrough, a vane on said movable member against which fluid passing through the regulator impinges to move said movable member in a direction to move said shutter part across said opening, a weight acting on said movable member in a direction to oppose the movement thereof by said vane, and means for securing said weight in different relations to said movable member to vary the extent to which said shutter part moves across said opening.

2. A flow regulator including a fixed member having an opening therein, a member movable about a pivot through a part of a revolution and arranged in close proximity to said fixed member and having a shutter part adapted to move across said opening to restrict the flow of fluid therethrough, a vane on said movable member against which fluid passing through the regulator impinges to move said movable member in a direction to move said shutter part across said opening, a weighted arm pivoted on the fixed part of said regulator, and connections between said weighted arm and said movable member adjustable to vary the position into which said weight moves said movable member when no fluid flows against said vane.

3. A flow regulator including a fixed member having an opening therein, a member movable about a pivot through a part of a revolution and arranged in close proximity to said fixed member and having a shutter part adapted to move across said opening to restrict the flow of fluid therethrough, a vane on said movable member against which fluid passing through the regulator impinges to move said movable member in a direction to move said shutter part across said opening, an arm pivoted on a stationary part of said regulator, a weight adjustable lengthwise of said arm, and connections between said arm and said movable member to cause the weight to urge said movable member into a position to uncover said opening to the desired extent, whereby the force exerted by said weight against the force of said vane may be varied by adjusting the weight on said arm.

4. A flow regulator including a fixed member having an opening therein, a member movable about a pivot through a part of a revolution and arranged in close proximity to said fixed member and having a shutter part adapted to move across said opening to restrict the flow of fluid therethrough, a vane on said movable member against which fluid passing through the regulator impinges to move said movable member in a direction to move said shutter part across said opening, an arm pivoted on a stationary part of said regulator, a weight adjustable lengthwise of said arm, and a connection between said arm and said movable member, said connection being adjustable to hold said movable member in different relations to the opening in said fixed member when no air is flowing against said vane.

5. A flow regulator, including a fixed member having an opening therein, a member pivoted to move through a part of a revolution and having a shutter part movable across said opening to restrict the flow of fluid therethrough, a vane on the movable member against which fluid passing through the regulator impinges to move said shutter part about said pivot in a direction across said opening, a crank arm extending outwardly from the pivot and mounted on said pivoted member and adjustable to different angular relations relative to said shutter part to determine the limit of the opening movement of said shutter part, and yielding means acting on said arm in a direction to hold said shutter part in open position, said yielding means being also adjustable to regulate the amount of force necessary to move the shutter part towards its closed position.

6. A flow regulator including a fixed member having an opening therein, a member movable about a pivot through a part of a revolution and arranged in close proximity to said fixed member and having a shutter part adapted to move across said opening to restrict the flow of fluid therethrough, a vane on said movable member against which fluid passing through the regulator impinges to move said movable member in a direction to move said shutter part across said opening, a lever pivoted between its ends on a stationary part of said regulator, yielding means acting on one arm of said lever and adjustable lengthwise of said arm to vary the force applied to said lever, to resist movement of said movable member by fluid flowing against said vane, and a connection between said lever and said pivoted member, said connection being adjustable to hold said pivoted member in different relations to said opening in said fixed member when no fluid is flowing against said vane.

DELBERT C. DODRILL.